US009501883B2

United States Patent
Handville et al.

(10) Patent No.: US 9,501,883 B2
(45) Date of Patent: *Nov. 22, 2016

(54) WIRELESS ACCESS CONTROL SYSTEM INCLUDING LOCK ASSEMBLY GENERATED MAGNETIC FIELD BASED UNLOCKING AND RELATED METHODS

(71) Applicant: Unikey Technologies Inc., Orlando, FL (US)

(72) Inventors: Justin Handville, Largo, FL (US); Philip C. Dumas, Orlando, FL (US)

(73) Assignee: UNIKEY TECHNOLOGIES INC., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,264

(22) Filed: Dec. 16, 2015

(65) Prior Publication Data

US 2016/0104334 A1 Apr. 14, 2016

Related U.S. Application Data

(63) Continuation-in-part of application No. 13/415,365, filed on Mar. 8, 2012.

(60) Provisional application No. 61/453,737, filed on Mar. 17, 2011.

(51) Int. Cl.
*G05B 19/00* (2006.01)
*G07C 9/00* (2006.01)
*H04B 5/00* (2006.01)

(52) U.S. Cl.
CPC ....... *G07C 9/00111* (2013.01); *G07C 9/00571* (2013.01); *H04B 5/0056* (2013.01); *G07C 2009/00793* (2013.01); *G07C 2209/04* (2013.01); *Y10T 70/5155* (2015.04)

(58) Field of Classification Search
CPC .............. B60R 25/24; G07C 2009/00793; G07C 9/00309; G07C 2009/00317; G07C 2009/00555; G07C 2209/06; G07C 2209/63; G07C 9/00182
See application file for complete search history.

(56) References Cited

U.S. PATENT DOCUMENTS 6,072,402 A  6/2000 Kniffin et al.
6,236,333 B1 * 5/2001 King ................... B60R 25/2036
                                                340/10.1

(Continued)

FOREIGN PATENT DOCUMENTS

CN  101532353  9/2009
JP  2000145222  5/2000

(Continued)

OTHER PUBLICATIONS

Dumas et al., U.S. Appl. No. 14/881,762, filed Oct. 13, 2015.

(Continued)

*Primary Examiner* — Kerri McNally
*Assistant Examiner* — Renee Dorsey
(74) *Attorney, Agent, or Firm* — Allen, Dyer, Doppelt, Milbrath & Gilchrist, P.A. Attorneys at Law

(57) ABSTRACT

A wireless access control system may include a remote access wireless device that includes a magnetic sensor and a remote controller coupled to remote wireless communications circuitry and the magnetic sensor. The system may also include a lock assembly for a door that includes a magnetic field generator and a lock controller coupled to a lock, lock wireless communications circuitry, and the magnetic field generator. The lock controller may communicate a magnetic field characteristic with the remote wireless communications circuitry, and cooperate with the magnetic field generator to generate a magnetic field based upon the magnetic field characteristic. The remote controller may cooperate with the magnetic sensor to sense the magnetic field, compare the sensed magnetic field to the magnetic field characteristic, and communicate to enable lock unlocking when the sensed magnetic field has a sensed magnetic field characteristic that matches the magnetic field characteristic.

60 Claims, 11 Drawing Sheets

(56) References Cited

U.S. PATENT DOCUMENTS

| | | |
|---|---|---|
| 6,611,742 B1 | 8/2003 | Sand et al. |
| 6,621,420 B1 | 9/2003 | Poursartip |
| 7,173,516 B2 | 2/2007 | Mullet et al. |
| 7,701,331 B2 | 4/2010 | Tran |
| 8,373,555 B1 | 2/2013 | Redden et al. |
| 9,057,210 B2 | 6/2015 | Dumas et al. |
| 9,196,104 B2 | 11/2015 | Dumas et al. |
| 9,218,696 B2 | 12/2015 | Dumas et al. |
| 2002/0013909 A1 | 1/2002 | Baumeister et al. |
| 2003/0222758 A1 | 12/2003 | Willats et al. |
| 2004/0027127 A1* | 2/2004 | Mills ............... G01R 33/482 |
| | | 324/317 |
| 2005/0010780 A1 | 1/2005 | Kane et al. |
| 2005/0237163 A1* | 10/2005 | Lee ................ G06K 19/0723 |
| | | 340/10.51 |
| 2006/0164207 A1* | 7/2006 | Wilcox ............... B60R 25/24 |
| | | 340/5.61 |
| 2006/0164208 A1 | 7/2006 | Schaffzin et al. |
| 2006/0247847 A1 | 11/2006 | Carter et al. |
| 2007/0203618 A1* | 8/2007 | McBride ............ B60R 25/24 |
| | | 701/2 |
| 2008/0018437 A1 | 1/2008 | Reichling et al. |
| 2008/0117176 A1 | 5/2008 | Ko et al. |
| 2008/0231433 A1 | 9/2008 | McBride et al. |
| 2008/0238610 A1 | 10/2008 | Rosenberg |
| 2009/0002153 A1 | 1/2009 | Berstis et al. |
| 2009/0066476 A1 | 3/2009 | Raheman |
| 2010/0052931 A1 | 3/2010 | Kolpasky et al. |
| 2010/0059231 A1 | 3/2010 | Thomas et al. |
| 2010/0164683 A1 | 7/2010 | Sharma et al. |
| 2010/0201536 A1 | 8/2010 | Robertson et al. |
| 2010/0245038 A1 | 9/2010 | Ghabra et al. |
| 2010/0306549 A1 | 12/2010 | Ullmann |
| 2011/0092185 A1 | 4/2011 | Garskof |
| 2011/0223868 A1 | 9/2011 | Kojima et al. |
| 2011/0309922 A1* | 12/2011 | Ghabra ............... B60R 25/24 |
| | | 340/426.36 |
| 2012/0234058 A1 | 9/2012 | Neil et al. |
| 2012/0258681 A1 | 10/2012 | Hanover |
| 2012/0280783 A1 | 11/2012 | Gerhardt et al. |
| 2013/0241694 A1 | 9/2013 | Sharma et al. |
| 2014/0077929 A1 | 3/2014 | Dumas et al. |
| 2014/0292481 A1 | 10/2014 | Dumas et al. |
| 2015/0211259 A1 | 7/2015 | Dumas et al. |
| 2015/0213658 A1 | 7/2015 | Dumas et al. |

FOREIGN PATENT DOCUMENTS

| | | |
|---|---|---|
| JP | 2003262072 | 9/2003 |
| KR | 20030083538 | 10/2003 |
| KR | 20040093937 | 11/2004 |
| KR | 20050005786 | 1/2005 |
| KR | 20080086623 | 9/2008 |
| KR | 2020100001206 | 2/2010 |
| WO | 2011159921 | 12/2011 |
| WO | 2012064263 | 5/2012 |

OTHER PUBLICATIONS

Dumas et al., U.S. Appl. No. 14/882,015, filed Oct. 13, 2015.
Handville et al., U.S. Appl. No. 14/971,308, filed Dec. 16, 2015.

* cited by examiner

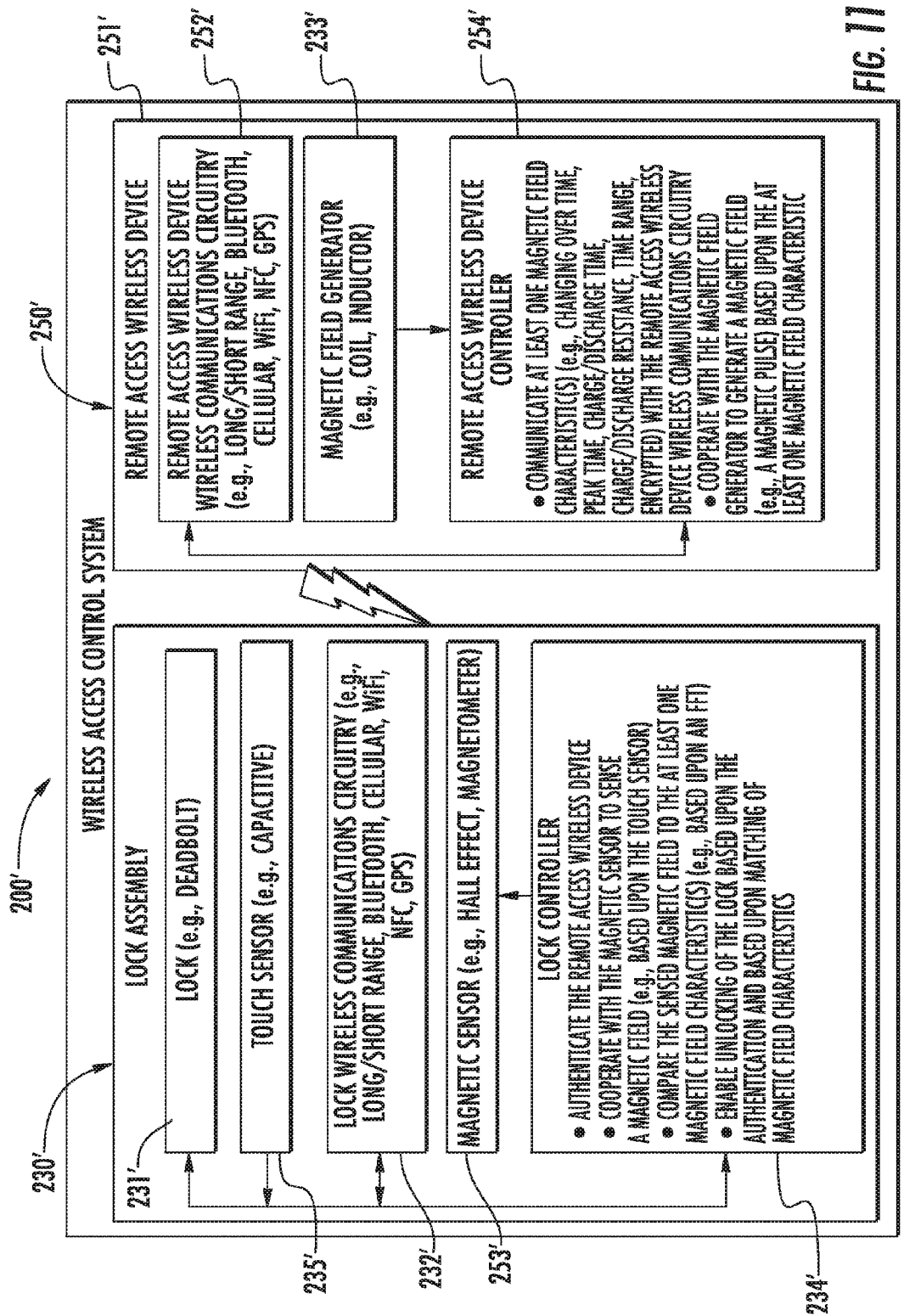

WIRELESS ACCESS CONTROL SYSTEM INCLUDING LOCK ASSEMBLY GENERATED MAGNETIC FIELD BASED UNLOCKING AND RELATED METHODS

FIELD OF THE INVENTION

The present invention generally relates to access control systems, and more particularly, to wireless access control systems.

BACKGROUND

A passive keyless entry (PKE) system, offers an increased level of convenience over a standard lock and key, for example, by providing the ability to access a secure building or device without having to find, insert, and turn a traditional key. A user may simply approach a locked PKE lock and with little if any pause, the lock grants this user access if they are carrying an authorized token.

A PKE system is currently used in an automotive application and may offer increased convenience by identifying drivers and unlocking the car as they approach. Automotive access is traditionally given by inserting a key into the lock or by pushing buttons on a traditional remote keyless entry (RKE) system. In contrast, a PKE system grants access with reduced user interaction through the use of a token carried by the driver.

Several technical challenges have been encountered during the engineering of a radio frequency (RF) PKE system, for example, for use in a residential lock. The desired basic perceived behavior of the PKE system in a residential application may be as follows: 1) the user approaches and touches the lock; 2) the lock authenticates the user with a minimally perceived delay; 3) the lock unlocks; 4) the lock may not operate if the authorized user is outside a desired range and the lock is touched by another, unauthorized, user; 5) the lock may not operate if the authorized user is on the inside of the house, and the lock is touched on the outside by an unauthorized user; and 6) the battery powered lock needs months worth of battery life to prevent inconvenient and costly battery changes. 7) when an authorized user revokes a key from another user, it may be revoked within a timely manner.

Indeed, as will be appreciated by those skilled in the art, with respect to the above desired basic perceived behavior of the PKE system in a residential application, primary challenges to be addressed include items 2 (speed), 4 (distance), 5 (location), 6 (battery life), and 7 (timely revocation). Accordingly, it may be desirable to improve authentication speed, proximity measurement, location determination, decrease power consumption, and timely revocation processes for example.

SUMMARY OF THE INVENTION

A wireless access control system may include a remote access wireless device to be carried by a user and comprising a remote housing, remote access wireless device wireless communications circuitry carried by the remote housing, a magnetic sensor carried by the remote housing, and a remote access wireless device controller coupled to the remote access wireless device wireless communications circuitry and the magnetic sensor. The wireless access control system may also include a lock assembly to be mounted on a door and that may include a lock, lock wireless communications circuitry, a magnetic field generator, and a lock controller coupled to the lock, the lock wireless communications circuitry, and the magnetic field generator. The lock controller may be configured to communicate, via the lock wireless communications circuitry, at least one magnetic field characteristic with the remote access wireless device communications circuitry, and cooperate with the magnetic field generator to generate a magnetic field based upon the at least one magnetic field characteristic. The remote access wireless device controller may be configured to cooperate with the magnetic sensor to sense the magnetic field, compare the sensed magnetic field to the at least one magnetic field characteristic, and communicate, via the remote access wireless device wireless communications circuitry and the lock wireless communications circuitry to enable unlocking of the lock when the sensed magnetic field has a sensed magnetic field characteristic that matches the at least one magnetic field characteristic. Accordingly, the wireless access control system may provide increased security based upon the generated magnetic field, for example, to address a potential relay attack.

The lock controller may be configured to communicate with the remote access wireless device communications circuitry for authentication of the remote access wireless device. The lock controller may be configured to enable unlocking of the lock based upon the authentication, for example.

The lock assembly may also include a touch sensor coupled to the lock controller. The lock controller may be configured to communicate the at least one magnetic field characteristic based upon the touch sensor, for example.

The lock controller may be configured to change the at least one magnetic field characteristic over time. The at least one magnetic field characteristic may include at least one of a peak time, charge time, discharge time, charge resistance, and discharge resistance, for example. The magnetic field may include at least one magnetic pulse, for example.

The at least one magnetic field characteristic may include a range of time for sensing the magnetic field, for example. The remote access wireless device controller may be configured to compare the sensed magnetic field based upon a fast Fourier transform. The lock controller may be configured to encrypt the at least one magnetic field characteristic, for example.

The magnetic sensor may include a Hall effect sensor. The magnetic sensor may include a magnetometer. The at least one magnetic field characteristic may include a plurality of magnetic field characteristics, for example.

A method aspect is directed to a wireless access control method for a wireless access control system that includes a remote access wireless device to be carried by a user and that includes a remote housing, remote access wireless device wireless communications circuitry carried by the remote housing, a magnetic sensor carried by the remote housing, and a remote access wireless device controller coupled to the remote access wireless device wireless communications circuitry and the magnetic sensor. The wireless access control system also includes a lock assembly to be mounted on a door and that includes a lock, lock wireless communications circuitry, a magnetic field generator, and a lock controller coupled to the lock, the lock wireless communications circuitry, and the magnetic field generator. The method includes using the lock controller to communicate, via the lock wireless communications circuitry, at least one magnetic field characteristic with the remote access wireless device communications circuitry, and cooperate with the magnetic field generator to generate a magnetic field based upon the at least one magnetic field characteristic. The method also includes using the remote access wireless device controller to cooperate with the magnetic sensor to sense the magnetic field, compare the sensed magnetic field to the at least one magnetic field characteristic, and communicate, via the remote access wireless device wireless communications circuitry and the lock wireless communications circuitry to enable unlocking of the lock when the sensed magnetic field has a sensed magnetic field characteristic that matches the at least one magnetic field characteristic.

BRIEF DESCRIPTION OF THE DRAWINGS

FIG. 11 is a schematic block diagram of a wireless access control system in accordance with an embodiment.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Figure 1:
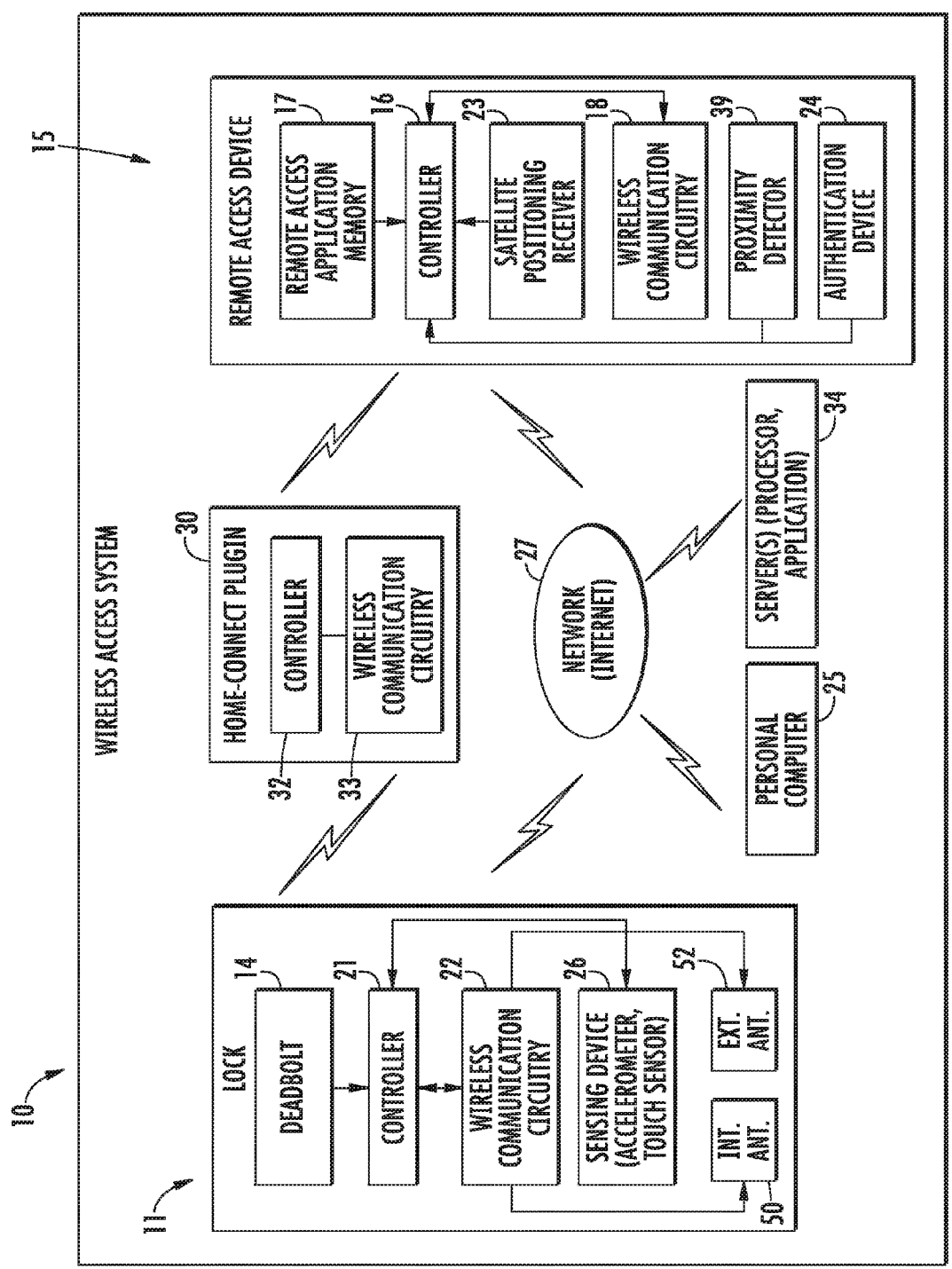
FIG. 1 is a schematic diagram of a wireless access system according to the present invention.
Figure 2A:
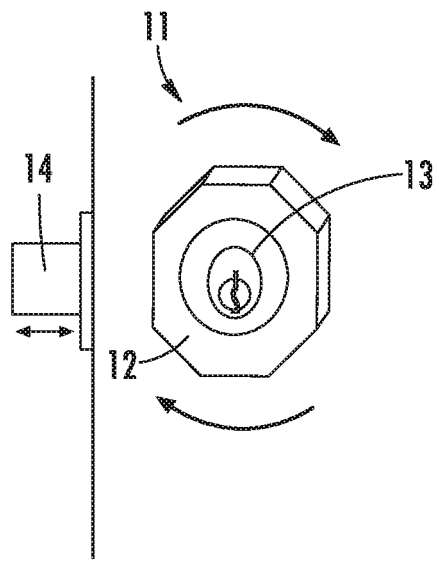
FIG. 2a is a perspective view of a lock constructed in accordance with the invention.
Figure 2B:
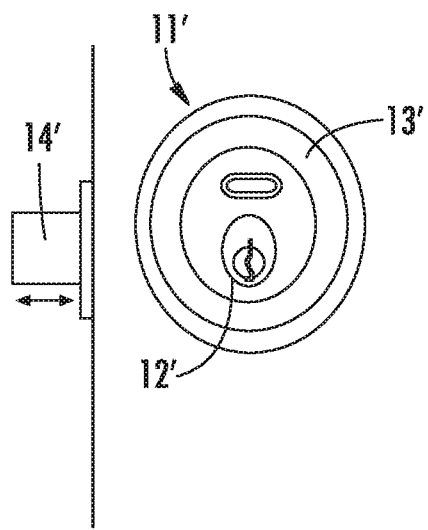
FIG. 2b is a perspective view of a lock constructed in accordance with another embodiment of the invention.

Referring to FIGS. 1, 2a, and 2b, a wireless access system 10, for example, a PKE system, includes a lock 11. The lock 11 may be installed in a standard deadbolt hole and may be battery powered, for example. The lock 11 may be a human controlled (keyed) lock, for example (FIG. 2a). The lock 11 includes an outer cylinder 12 that rotates freely around a standard key cylinder 13. When engaged, the cylinder 13 is linked to a deadbolt 14, thus giving the user control to extend or retract the deadbolt utilizing their key. The lock 11 includes a controller 21 or processor and wireless communication circuitry 22 for wireless communication which as will be discussed below, enable remote access device 15 to operate lock 11.

Alternatively, in another embodiment, the lock 11' may be motor powered (FIG. 2b). When a user is in sufficiently close vicinity or touches anywhere on the lock 11', the deadbolt 14' is driven by the motor (not shown) to open the lock for authorized users having the remote access device 15. Of course, the lock 11 may be another type of lock or locking mechanism and may be installed in any access point, for example.

Figure 3A:
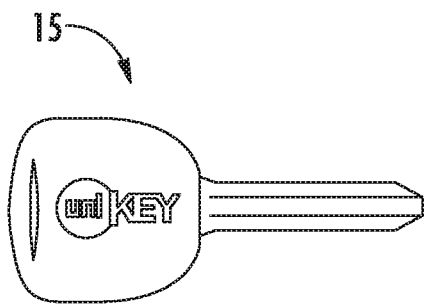
FIG. 3a is a top plan view of a remote access device constructed in accordance with the invention as a key.

Referring now additionally to FIG. 3, the wireless access system 10 includes a remote access device 15. The remote access device 15 is advantageously a key or token configured to control the lock 11. In particular, the remote access device 15 may be a standard key including a remote controller 16 for controlling lock 11 and remote wireless access electronics coupled thereto (FIG. 3a). Remote access device 15 also includes wireless communication circuitry 18 for sending and receiving signals. In a preferred non-limiting example, the signal is a Bluetooth signal.

Figure 3B:
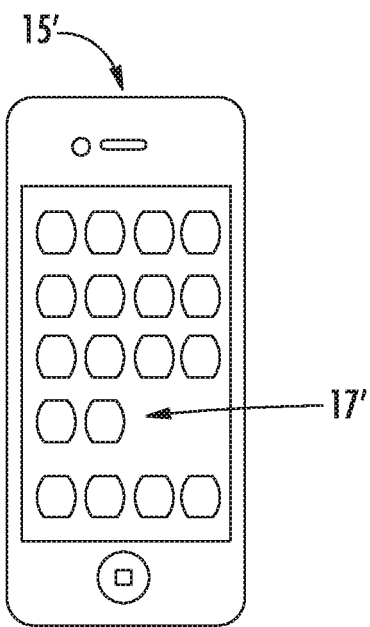
FIG. 3b is a front plan view of a remote access device constructed in accordance with yet another embodiment of the invention as an application for a cell phone.

Alternatively, or additionally, the remote access device 15 may be a mobile wireless communications device, such as, for example, a mobile telephone that may include the remote wireless access electronics described above cooperating with an application 17' stored in memory 17 (FIG. 3b). The application 17' may be configured to send a signal to provide access and control over the lock 11', for example. Of course, more than one remote access device 15' may be used and may be another type of remote access wireless device, for example, a wireless FOB without the mechanical key, as will be appreciated by those skilled in the art.

Figure 4:
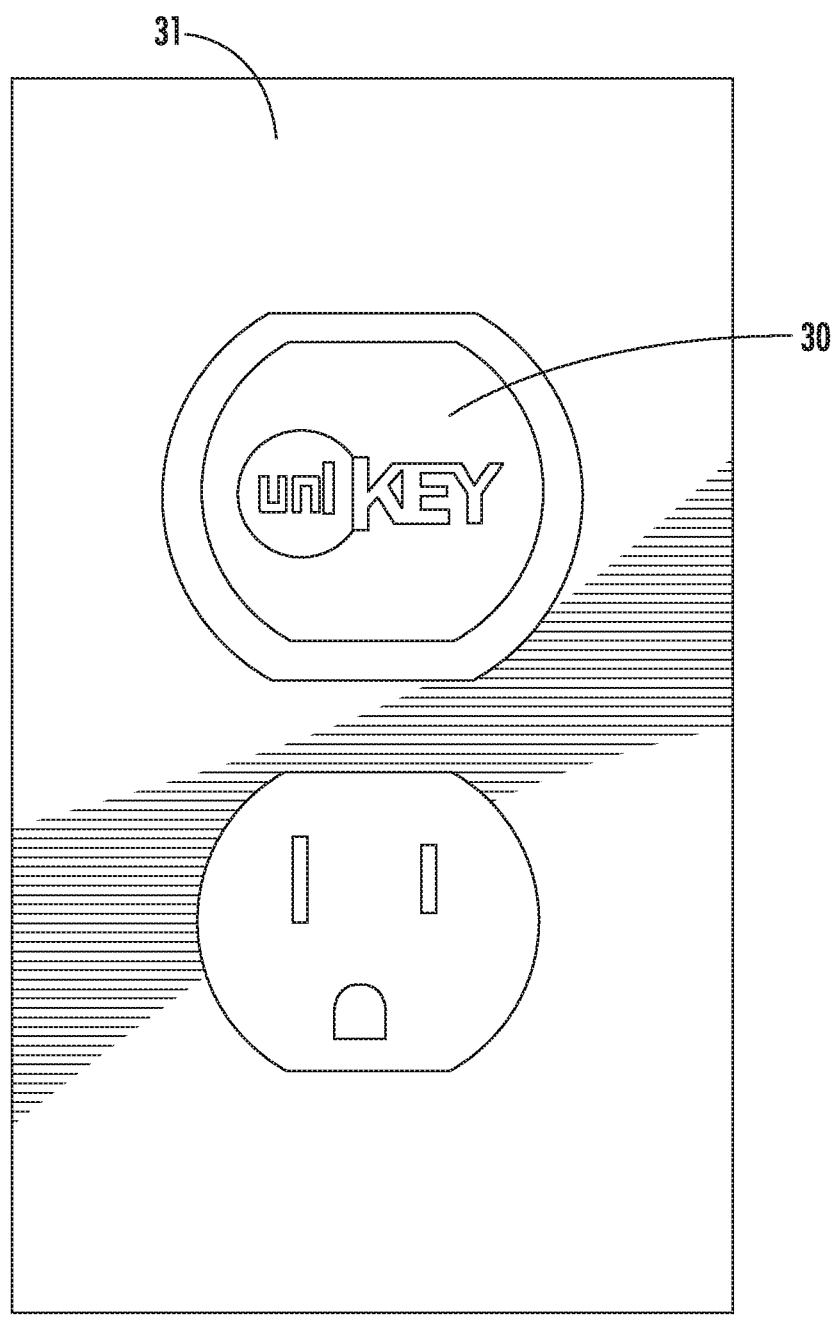
FIG. 4 is a front plan view of a home-connect plugin of the wireless access system constructed in accordance with the invention.

Referring now additionally to FIG. 4, the wireless access system 10 also includes a home-connect plugin 30. A typical mains power outlet 31 is shown, with the home-connect plugin 30 plugged-into it. The home-connect plugin 30 includes a home-connect controller 32 and associated wireless communication circuitry 33 cooperating therewith and configured to communicate with the lock 11, and the remote access device 15.

The home-connect plugin 30 may also be part of a wireless local area network (WEAN) connectivity, for example, Wi-Fi connectivity, to link it to an off-site web-based server 34, for example. This advantageously enables the lock 11 to receive near real time updates for adding or removing users, one-time access, extended access or specific timed access, and other connectivity related updates and functions, as will be appreciated by those skilled in the art. Additional services may be selectively provided via the Internet using the WLAN connectivity provided by server 34, for example. While the home-connect plugin 30 is described herein as a plugin device, it will be appreciated by those skilled in the art that the functionality of the home-connect plugin 30 may be embodied in any of a number of form factors, for example.

Figure 5:
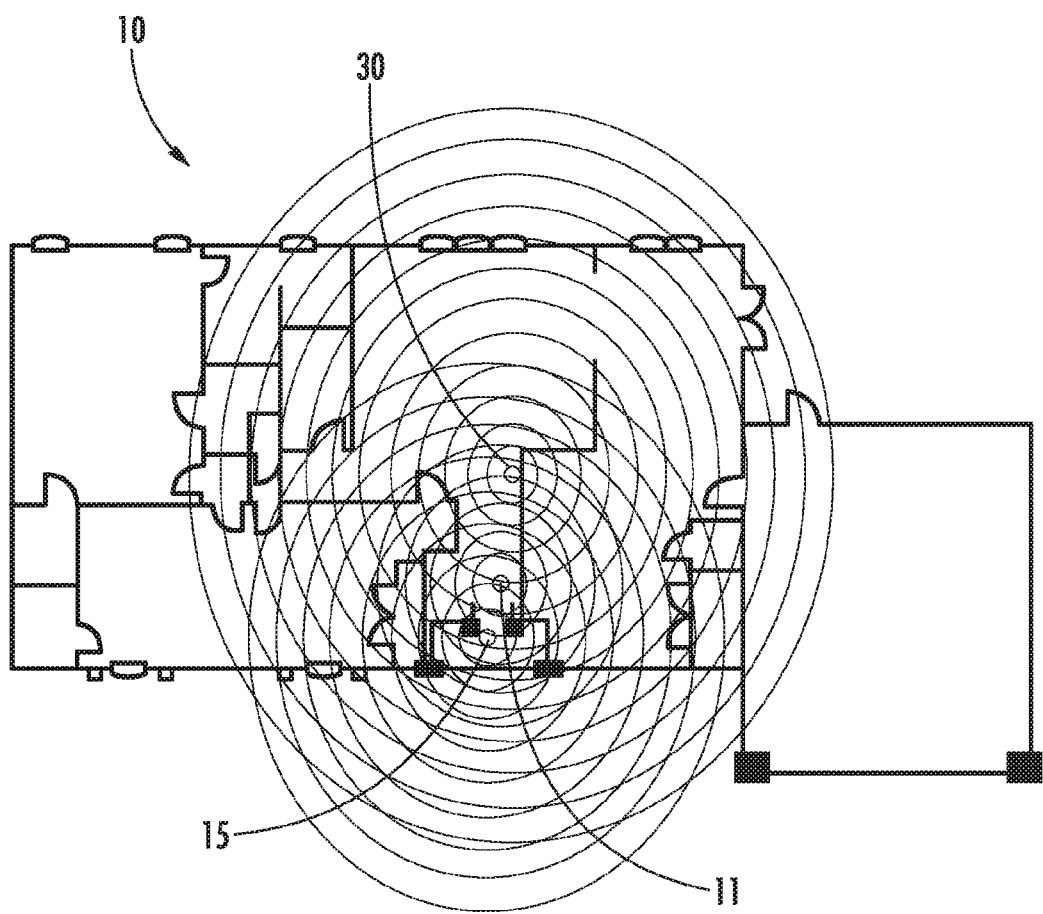
FIG. 5 is a schematic diagram of the communication between the components of the wireless access system in a typical residential system layout in accordance with the invention.

Referring now additionally to FIG. 5, a typical residential setup example of the wireless access system 10 is illustrated.

As described above with respect to FIG. 4, the home connect plugin 30 is typically plugged-in to the mains power outlet 31, at a location in relatively close proximity, sufficient to communicate therewith, to the lock 11, which may be installed on the front door, for example. The remote access device 15 approaches from the outside of the home. Both the home-connect plugin 30 and lock 11 are configured to communicate with the remote access device 15 independently or simultaneously, as will be described below and appreciated by those skilled in the art.

The home-connect plugin 30 may be configured to approximately determine the position of the remote access device 15. In a preferred non-limiting embodiment, the home connect plugin 30 periodically sends a signal to communicate with a remote access device 15. When remote access device 15 is within range to receive the signal, remote access device 15 outputs a return signal to home-connect plugin 30. Lock 11 may also receive, the signal from remote access device 15. By determining a received signal strength indication (RSSI). For example, when an algorithm of the home-connect plugin 30 determines that the remote access device 15 is approaching and is within a defined range.

In one non-limiting exemplary embodiment, lock 11 is in a hibernation or low power level state. Upon determining that the remote access device is within a predetermined distance, the home-connect plugin 30 may send a wakeup signal to the lock 11. In this way, home-connect plugin 30 may be configured to have an extended range capability, for example, 100 or more meters. The lock 11 has a smaller range, for example, of about 10 meters, but may be greater in some cases. Therefore, the home-connect plugin 30 may communicate with the remote access device 15 before the lock 11. Thus, the home-connect plugin 30 may send a signal to the lock 11 to wake up and start communicating with the remote access device 15 to save battery life, for example. By causing remote access device 15 and lock 11 to communicate only in response to a signal from home-connect plugin 30, the battery life of lock 11 and remote access device can be extended.

Figure 6:
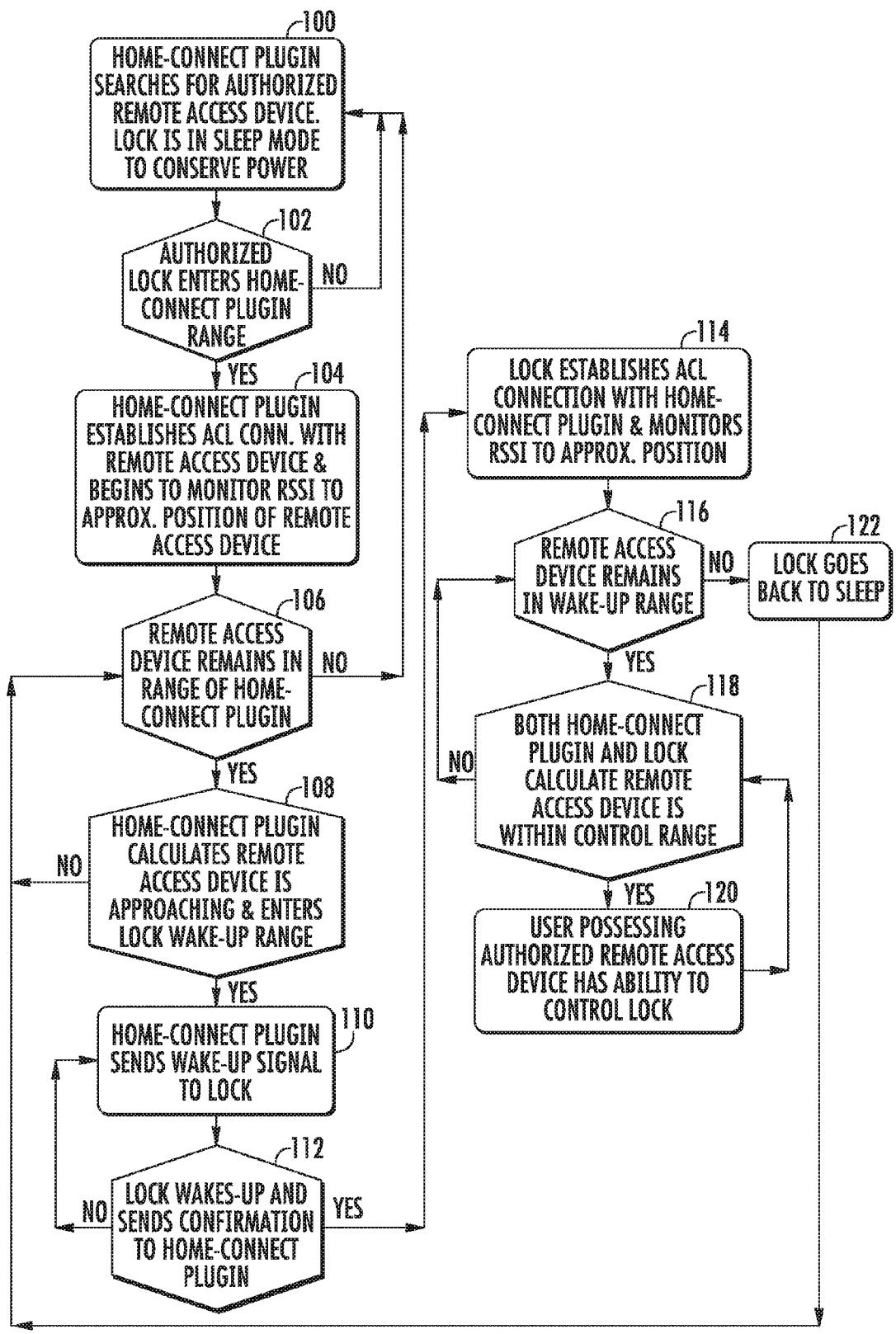
FIG. 6 is a flow chart of operation of the wireless access system in accordance with the invention.

Additionally, the home-connect plugin 30 may establish a communication link with the remote access device 15 in advance, for example, thus increasing the speed of the authentication process to create little if any perceived delay for the user. Once the lock 11 is woken up by the home-connect plugin 30 and connected to the remote access device 15, both the home-connect plugin and the lock track the RSSI of the remote access device until the algorithm determines it is within a defined accessible range from lock 11. Both the home-connect plugin 30 and the lock 11 gathering RSSI data together may utilize this data in an algorithm to determine the position of the remote access device 15 with greater accuracy than either the home-connect plugin 30 or lock 11 alone. Once the remote access device 15 is within the determined accessible distance, the home-connect plugin 30 grants remote access device 15 access control to the lock 11. More than one home-connect plugin 30 may be used in some embodiments for more accurate position determining, and to increase authorized user capacity and overall speed of the wireless access system 10, Operation of the wireless access system 10 will now be described with reference additionally to the flowchart in FIG. 6. The lock 11, may initially be in a sleep mode to conserve battery power, for example. The home-connect plugin 30 is typically powered on and searching for authorized remote access devices 15, i.e. token(s), the standard key, and/or the mobile wireless communications device, in range in a step 100. In one preferred non-limiting embodiment, authorization is established by syncing the Bluetooth identifier of remote access devices 15 and home-connect plugin 30 as known in the art. The home connect plugin 30 establishes an asynchronous communication link, (ACL) connection. In this way the system is self authorizing and it only recognizes components with which it has established a connection.

The authorized remote access device 15 enters the home connected plugin 30 broadcast range in a step 102. Once the home-connect plugin 30 finds an authorized remote access device 15 in range, it establishes connection in a step 104 and begins to monitor the RSSI of the return signal from remote access device 15 to estimate its position.

In a step 106, it is determined whether remote access device 15 remains in range of the home connect plugin 30 if not the process returns to step 100 to begin again. If yes, then home connect plugin 30 calculates whether remote access device 15 is approaching and whether it enters the lock wake-up range in step 108. If not, step 106 is repeated. Once the home-connect plugin 30 estimates that the remote access device 15 has entered the defined wake-up range in a step 108, it sends a wake-up and connection signal to the lock 11 in a step 110.

In a step 112 it is determined whether lock 11 wakes up and sends confirmation to home connect plugin 30. If not, the wake-up signal is repeated in step 110. Once the lock 11 wakes up, it also establishes a low level connection with the remote access device 15 in a step 114, and begins to monitor the RSSI of the remote access device 15 or devices if there are more than one. Both the home-connect plugin 30 and the lock 11 are monitoring RSSI to more accurately determine the position of the remote access device 15 in a step 118. This computing may be performed by a processor or controller 32 included within the home-connect plugin 30, the controller 21 within lock 11, or both. The home-connect plugin 30 and the lock 11 determine whether the remote access device is within the determined accessible distance in step 116. It is determined whether the home connect plugin 30 and lock 11 calculate the remote access device 15 is within the control range. If not, the determination is again made in step 116; if yes, then the user is granted authorization to the lock 11, and the deadbolt 14 becomes controllable in a step 120, either extending or retracting per the user's action.

If the remote access device 15 is not within the wake-up range of lock 11, then lock 11 goes back to sleep or a low power mode, in a step 122.

Additional and/or alternative functions of the wireless access system 10 will now be described. For example, with respect to an independent function, plugin 30 continuously pings lock 10 at a low energy level. If the home-connect plugin 30 loses power or goes offline, the lock 11 may be configured to have a change of status to wake up in the absence of the signals from plugin device 30, or to be woken up by a user's touch and approximately determine the position of the user by itself, as well as authenticate the user I a manner similar to that described in connection with plug in device 30. In an embodiment in which the remote access device is a smart phone, tablet, or similar device, home-connect plugin 30 may also request the user to verify their access control request by prompting them on their remote access device 15', for example, via a display on their mobile wireless communications device.

The wireless access system 10 may include a calibration feature. More particularly, a connection between the home-connect plugin 30 and the lock 11 may be used by the algorithm to calibrate the RSSI input to adjust for changes in user behavior or environmental conditions, for example. In one non limiting example, plugin device 30 determines RSSI values for remote access device 15 over a number of distinct communications. It then determines a maximum average in range value in which communication between plugin device 30 and remote access device 15 occurs and a minimum average in range value at value in which communication between plugin device 30 and remote access device 15 occurs. In this way, the distances at which plugin 30 begins communicating with remote access device 15 self adjusts as a function of user behavioral changes or local conditions.

In a process to revoke a key where the key is a smart phone, tablet or the like, once a user decides to revoke a key code, the user may send a termination request to home-connect plugin 30 or to the remote access device key 15' being revoked. If there is no response, the request is broadcast to users, for example, all users, in the "approved" network (i.e. users enrolled in the same lock). The request is stored in the background on their respective keys. Then when any authorized user is in range of the lock 11, the claimant request is activated and the key code of the requested revoked user is revoked from the lock, denying access to the revoked user.

The wireless access system 10 may also include a computing device 25, for example, a personal computer at the user's residence for use in the revocation process. The computing device 25 may include circuitry for wirelessly communicating with the home-connect plugin 30, remote access device 15, and/or lock 11 for revoking the permission. For example, the computing device 25 may include Bluetooth communications circuitry, for example. Other devices and communications protocols may be used in the revocation process.

While the wireless access system 10 is described herein with respect to a door, the wireless access system may be used for access control or protection of, but not limited to, appliances, a safe, heavy machinery, factory equipment, power tools, pad locks, real estate lock-boxes, garage door openers, etc., for example. Alternative remote access device 15 embodiments may include a pen, watch, jewelry, headset, PDA, laptop, etc., for example. The wireless access system 10 may be used to protect other devices or areas where it may be desired to restrict access.

Figure 7:
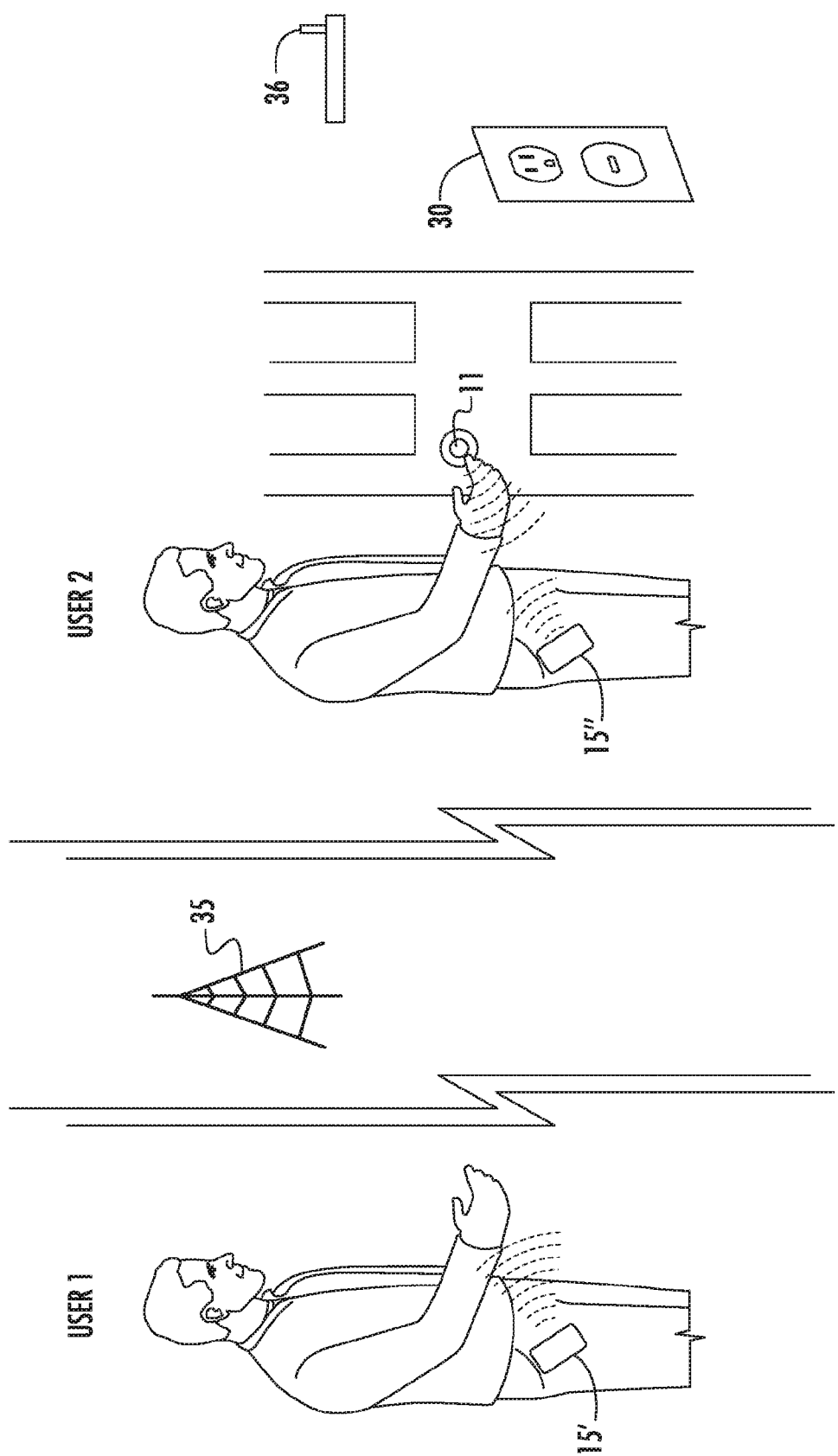
FIG. 7 is a schematic diagram of a system for changing tokens in accordance with the invention.

The present invention lends itself to a process for transferring one-time, limited time, or permanent use Passive Keyless Entry (PKE) token key codes to a cellular or other wireless mobile remote access device 15' for use with PKE access control devices. Reference is now made to FIG. 7. In one exemplary, but non limiting embodiment, a first user has a first remote access device 15' embodied in a mobile communication device that is PKE enabled and is known to plugin device 30 as an authorized user of lock 11. A second user has a second remote access device embodied in a mobile communication device 15" that is PKE enabled, but is not authorized for use with lock 11. Both users can communicate locally with lock 11 via a wireless Bluetooth network as discussed above. Furthermore, both users have the ability to communicate with each other via a cellular network 35 as known in the art, or other wireless communication and as a result have an almost unlimited range.

The authorized user of lock 11, chooses to send an unauthorized user an authorized token for the lock 11 by way of a mobile application 17 on authorized remote access device 15' to unauthorized remote access device 15". The authorized user can select the option within mobile application 17 on authorized remote access device 15' for a one-time, limited time, or permanent token to send to unauthorized remote access device 15".

In one exemplary, but non limiting embodiment, the key code is transmitted from the authorize remote access device 15' to the currently unauthorized remote access device 15" via the cellular network 35. Now unauthorized remote access device 15" becomes an authorized user of the lock 11. Another embodiment can be that authorized remote access device 15' sends a request for information to unauthorized remote access device 15" which responds to authorized remote access device with useful information such as device 15" Bluetooth address. This information is then transmitted from authorized remote access device 15' to the home connect plugin 30 via the cellular network 35 to the internet, then from the internet to a WiFi router 36 that is in range and can relay the information to the plugin 30. The plugin 30 then transfers identification information to the lock 11, so that when now authorized remote access device 15" tries to access the lock 11, it is already a known remote access device.

It should be noted that the use of the mobile phone cellular network was used by way of non limiting example. The key code can be sent directly to another device via SMS text message, Email, or other data communication protocols. Additionally, the key codes can be sent to another device through server 34, or a server disposed in the communications network, which can also act as a master database. Additionally, the key code master database can allow a user to manage (send, receive, revoke) locks from a secured webpage. Additionally, the key code master database can be used to restore a devices key codes via a mobile application with verification upon a lost or damaged device.

With respect to power conservation and increased security methods for the remote access device 15, and more particularly, a mobile wireless communications device 15', for example, that may include the remote access application and a global positioning system (GPS) receiver 23, the GPS receiver may be used to track the location relative to the lock's position and enable communication by remote access device 15 only when within range. If the remote access device 15, i.e. mobile wireless communications device 15' is outside the range, as determined by the GPS receiver 23, it may go into sleep mode or turn off. Additionally, or alternatively, the location of the mobile wireless communication device 15' may be determined via triangulation with wireless service provider base stations or towers, for example.

Alternatively, or additionally, the remote access device 15 or mobile wireless communications device 15' may wake up, determine a position, calculate a fastest time a user could be within range of the lock 11, then wake up again at that time and recalculate. When the user is within the range, it may enable the remote access application 17, and, thus communication for authentication or other purposes.

The wireless access system 10 may be used to augment multi-factor authentication, e.g. use with a biometric identifier, personal identification number (PIN) code, key card, etc. The wireless access system 10 may also allow simultaneous multiple authentication of remote access device, for example, mobile wireless communications devices. More particularly, the wireless access system 10 may require a threshold number of authorized remote access devices 15 to be present at a same time for authentication to succeed.

The wireless access system 10 advantageously may provide increased security, for example. More particularly, the wireless access system 10 may force the user to authenticate in addition to authorization, via the remote access device 15 before the door can be opened. For example, the remote access device 15 may include an authentication device 24 for authentication via a biometric, password, PIN, shake pattern, connect-the-dots, or combination thereof, for example, prior to accessing the lock 11. In the case of the remote access application 17 on a mobile wireless communications device, for example, the application may have multiple security levels to enable these features, as will be appreciated by those skilled in the art.

With respect to security features, by using proximity sensors, switches, or the like, the wireless access system 10 may indicate whether a user locked the door, for example. When a user locks the door, for example, the remote access application 17 may log "Lock" with a time stamp so that it may be tracked and checked on the remote access device 15, i.e. the mobile wireless communications device, for example. The wireless access system 10 may include a sensing device 26 for example, an accelerometer to track door openings, for example. Based upon the accelerometer, data may be provided through the application or via the Internet or other network, for example. The sensing device 26 may be another type of device, for example, a touch sensor.

In one advantageous security feature, when the door is opened, or an attempt is made to open the door, which may be detected by the accelerometer 26 or other door opening determining methods, as will be appreciated by those skilled in the art, known, and even previously revoked, remote access devices 15 in range and/or discoverable devices, may be recorded along with a time stamp. This may capture an unauthorized user, for example.

Another advantageous feature of the wireless access system 10 may allow authorized visits, for example. More particularly, an authorized visit may be enabled by a 911 dispatcher or other authorized user to allow special or temporary access by the smart phone of a normally unauthorized user, for example. The wireless access system 10 may keep a log/audit trail. Approval may be granted by trusted a friend or special authority, for example, emergency medical services, a fire department, or a police department.

The wireless access system 10 may also include a security feature whereby when a threshold time has elapsed, the wireless access system may ignore a remote access device 15 in range. This advantageously reduces or may prevent unauthorized access that may occur from leaving a remote access device 15 that is authorized inside near the door. A timeout function (via a timer, not shown) may additionally be used in other undesired entry scenarios. The wireless access system 10 may also log all rejected pairing attempts, as will be appreciated by those skilled in the art.

The wireless access system 10 may also include a revocable key security feature. For example, the wireless access system 10 may include both revocable and non-revocable keys. If, for example, the wireless access system 10 is unable to access the server 34 to verify keys, for example, the wireless access system may force the application 17 on the remote access device 15, for example, to check the servers. If the wireless access system 10 is unable to connect or verify the keys, access is denied.

For example, the revocable key feature may be particularly advantageous to keep an old boyfriend, for example, who is aware that his key is being revoked from being able to turn off his remote access device 15 so that the key is not deleted. However, a wireless connection for the remote access device 15 may be a prerequisite to access in some instances.

As will be appreciated by those skilled in the art, the wireless access system 10 has the ability to transfer a key from one remote access device 15 to another with the remote access application 17, for example. It may be desired that these keys be revocable in some configurations. However, if the remote access device 15 with the key to be revoked is not accessible via the network 27, then revocation may not be guaranteed if the lock 11 is offline, for example. The wireless access system 10 advantageously addresses these challenges A proximity detection feature may be included in the wireless access system 10, and more particularly, the remote access device 15 may use a magnetic field sensor 39, such as, for example, a compass in mobile wireless communications device, as a proximity sensor to obtain a more uniform approach/departure distance calibration. A magnetic pulse or pulse sequence may be used in the lock 11 to illuminate a magnetic flux sensor in the remote access device 15 to establish proximity.

Additionally, the remote device 15, for example, a mobile wireless communications device or mobile telephone, may be qualified using both radio frequency (RF) and audio, for example. The remote access device 15 may be a source or sink of audio to help qualify proximity.

In another embodiment, as an alternative to a human driven lock, as noted above, a turn-tab (not shown) may be included that will "flip out" of the front of the lock 11 when pressed to allow the user to turn the lock on an un-powered deadbolt 14. It may be desirable that the surface area be no larger than a standard key, for example. The user pushes the turn-tab back into the lock face when done. The turn-tab may alternatively be spring loaded, for example.

In another embodiment, the turn-tab (not shown) may be added to a powered lock, for example the lock 11 described above. This is may be useful to help force 'sticky' locks, for example, as will be appreciated by those skilled in the art. This may also allow the user to give a manual assist to the motor in case of a strike/deadbolt 14 misalignment. This may also allow for operation in a low battery situation, for example. The turn-tab may be particularly useful in other situations.

Additionally, one of the deadbolts may have a traditional key backup as it may be needed for emergencies, for example, while the remaining deadbolts on a house may be keyless. This may eliminate the need to match physical keys on multiple deadbolts, and may reduce the cost for additional deadbolts.

The wireless access system 10 may also include an additional access feature. For example, with the home-connect plugin 30 connected to the Internet through server 34 and/or personal computer 25, for example, it may be possible to have the lock 11 unlock via a command from the wireless access system. In other words, the lock 11 could be opened for users who don't have a remote access device 15. More particularly, they could call a call center or service that could unlock the lock 11 via the Internet 27, for example, or via other wireless communications protocol. Also, an authorized user could provide this action as well. Additionally, fire/police could gain access by this method if the lock owner opts-in to this service. As will be appreciated by those skilled in the art, alternatively, a command could be sent from the remote access device 15.

The wireless access system 10 may also include an activation indication. For example, the remote access device 15 can signal the operator via an auditory tone, vibration or other indication when the lock is activated. This may help communicate actions to the user to reduce any confusion.

The wireless access system 10 may also include an additional security feature. For example, the wireless access system 10 may use an additional authentication channel, for example, via a WLAN, WiFi, or other communication protocol, either wired or wireless, with the remote access device 15. This may improve authentication and make spoofing considerably more difficult, as will be appreciated by those skilled in the art.

As another security feature of the wireless access system 10, if cell service and data service, for example, if the remote access device 15 is a mobile phone, are turned off, remote access application may consider this a threat related to key revocation and authentication may not be approved. Also, the lock 11 may include a radar device, or a radar device may be coupled adjacent the lock to detect the locations of the entrant by facing outward in its sweep to resolve inside/outside ambiguity, for example. If the radar does not detect an entrant, then by default the holder of the remote access device is inside and the lock is not activated. The radar may be enabled when the lock 11 is woken up by the home-connect plugin 30 to conserve power.

The lock 11 includes an interior facing directional antenna 50 and a an external facing directional antenna 52. Each is operatively coupled to wireless communication circuitry 22 to send signals to, and list for signals from, remote access device 15. If remote access device 15 is interior of the lock, then interior facing directional antenna 50 communicates with remote access device 15, and the signal strength sensed by directional antenna 50 will be greater than the signal strength sensed by directional antenna 52 (which may be no sensed signal). Lock 11, and in turn system 10, determine that remote access device is inside the home, dwelling or structure. Conversely, if remote access device 15 is exterior of the lock, exterior facing directional antenna 52 communicates with remote access device 15 and the signal strength at directional antenna 52 is greater than the signal strength received at directional antenna 50. System 10 determines that remote access device 52 is outside of the dwelling and operates as discussed above. Home-connect plugin 30 compares the signals from interior facing directional antenna 50 and exterior facing directional antenna 52 to confirm the location of remote access device 12 prior to enabling remote access device 15 to control lock 11. This prevents the door from unlocking each time someone within the structure passes by the lock.

A mechanical or zero/low-power tilt sensor may be configured to detect break-in events, for example to the lock 11. eased upon a detected break-in, the lock 11 activate and thereafter communicate to home-connect plugin 30 to report an intruder alert. The lock 11 may also store information, in a memory, for example, if home-connect plugin is off-line.

Radar or other motion detector device (not shown) may also be added to the home-connect plugin 30 to assist with inside/outside determination and break-in monitoring. The radar or other motion detector may be used in conjunction with an alarm system, as will be appreciated by those skilled in the art.

Indeed, while the different components of the wireless access system 10 have been described with respect to a wireless protocol, it will be appreciated by those skilled in the art that the components may communicate via a wired network and protocols or a combination of wired and wireless networks. Additionally, while Bluetooth and WLAN (i.e. WiFi) has been described herein as wireless protocols of particular merit, other wireless protocols may be used, for example, Zywave, ZigBee, near field communication (NFC), and other wireless protocols.

Figure 8:
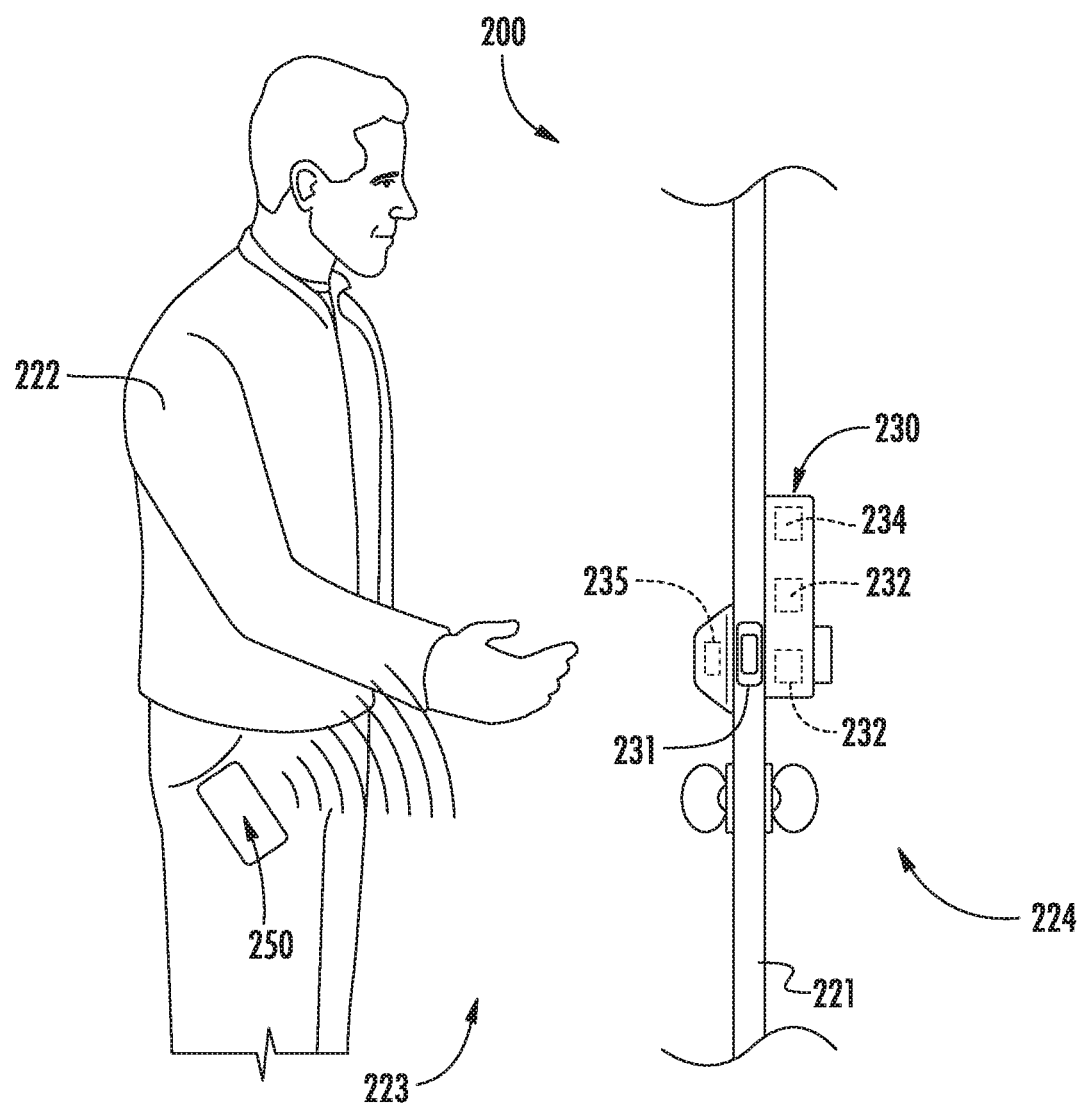
FIG. 8 is a schematic diagram of a wireless access control system according to an embodiment.
Figure 9:
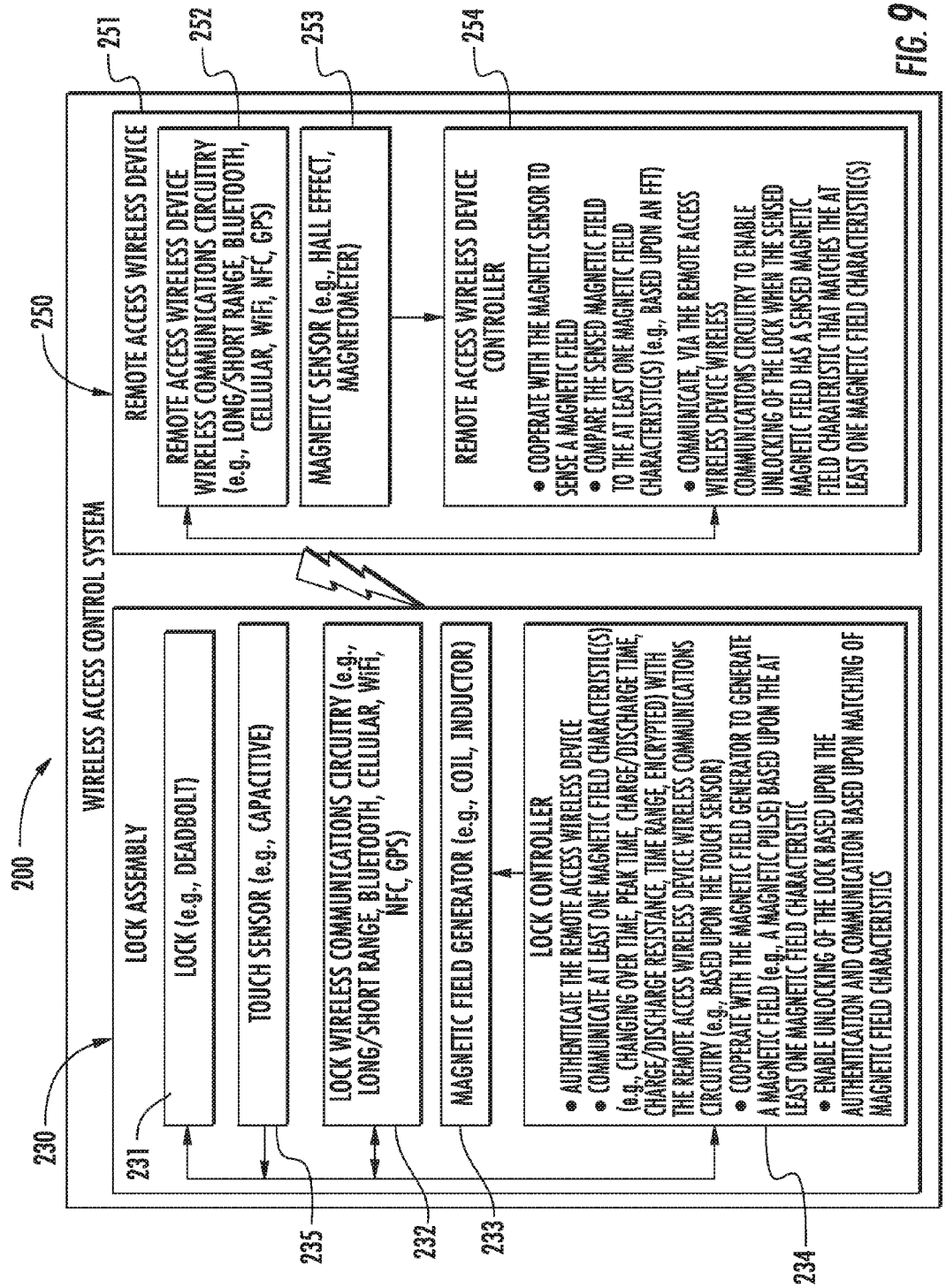
FIG. 9 is a schematic block diagram of the wireless access control system of FIG. 8.

Referring now to FIGS. 8-9, in another embodiment, a wireless access control system 230 may include a remote access wireless device 250 to be carried by a user 222. The remote access device may include a remote housing 251, remote access wireless device wireless communications circuitry 252 carried by the remote housing, a magnetic sensor 253 carried by the remote housing, and a remote access wireless device controller 254 coupled to the remote access wireless device wireless communications circuitry and the magnetic sensor. The magnetic sensor 253 may be a Hall effect sensor, magnetometer, and/or other device for sensing a magnetic field, for example.

A lock assembly 230 is to be mounted on a door 221 and includes a lock 231, for example, a deadbolt, lock wireless communications circuitry 232, a magnetic field generator 233, and a lock controller 234 coupled to the lock, the lock wireless communications circuitry, and the magnetic field generator.

The lock wireless communications circuitry 232 may be configured to communicate via one or more short range wireless communications protocols, for example, Bluetooth, NFC, WLAN, or other communications protocols. The lock wireless communications circuitry 232 may also communicate via a long range communication protocol, for example, cellular, or global positioning system, or other long range communication protocol. The lock wireless communications circuitry 232 may communicate using either or both of one or more short and long range protocols, as will be appreciated by those skilled in the art.

The magnetic field generator 233 may include a coil, for example.

The lock assembly 230 also includes a touch sensor 235, for example, facing the exterior area. The touch sensor 235 may be a capacitive or light based touch sensor, for example, and senses the touch of a user. The lock controller 234 may switch the lock between the locked and unlocked positions based upon the touch sensor.

The lock controller 234 communicates with the remote access wireless device communications circuitry 252 for authentication of the remote access wireless device 250. Authentication may be based upon any of a signal from the remote access wireless device 250, a geographic area of the remote access wireless device, any number of operations of the lock assembly, e.g. the touch sensor and/or manual operation of the lock, and door position. Authentication may include comparing a remote access wireless device ID to stored IDs. Of course, other and/or additional authentication techniques may be used.

The lock controller 234 communicates, via the lock wireless communications circuitry 232, a magnetic field characteristic with the remote access wireless device communications circuitry 252. The magnetic field characteristic may be communicated between the remote access wireless device 250 and the lock assembly 230 by way of a secure communications channel, for example, a Bluetooth connection, and based upon the user 222 touching the touch sensor 235.

The magnetic field characteristic may include, for example, a peak time, charge time, discharge time, charge resistance, discharge resistance, and a range of time for sensing the magnetic field (e.g. a time range to expect a magnetic field, pulse, or charge/discharge of the coil). Other and/or additional magnetic field characteristics may be included, as will be appreciated by those skilled in the art.

In some embodiments, more than one magnetic field characteristic may be sent, for example, at different spaced apart times. In other words, the magnetic field characteristic may be time varying or change over time. More than one magnetic field characteristic may be sent during a given communication. The magnetic field characteristics may be determined by way of an algorithm and may be encrypted for increased security.

The lock controller 234 also cooperates with the magnetic field generator 233 to generate a magnetic field, for example, in the form of a magnetic pulse, based upon the magnetic field characteristic. More particularly, the magnetic pulse is generated to have one or more of the magnetic field characteristics.

The remote access wireless device controller 254, once the magnetic field characteristic has been communicated, for example, through the secure communications channel, waits or polls for a sensed magnetic field. More particularly, the remote access wireless device controller 254 cooperates with the magnetic sensor 253 to sense the magnetic field and may normalize the sensed magnetic field (pulse or waveform). The remote access wireless device controller 254 compares the sensed magnetic field to the magnetic field characteristic. The remote access wireless device controller 254 may compare the sensed magnetic field to the magnetic field characteristic based upon a fast Fourier transform, for example.

The remote access wireless device controller 254 also communicates, via the remote access wireless device wireless communications circuitry 252 and the lock wireless communications circuitry 232 to enable unlocking of the lock 231 when the sensed magnetic field has a sensed magnetic field characteristic that matches the magnetic field characteristic. Thus, when the sensed magnetic field has a sensed magnetic field characteristic that matches the magnetic field characteristic, and when the remote access wireless device 250 has been authenticated, the lock controller 234 may switch the lock 231 between the locked and unlocked positions. As will be appreciated by those skilled in the art, a magnetic field having desired characteristics may be increasingly difficult to replicate.

As will be appreciated by those skilled in the art, the above-described wireless access control system 200 may be particularly advantageous for reducing the chances of a relay attack. A relay attack is essentially an unauthorized interception of network traffic to trick a lock into thinking the remote access device is positioned directly in front of the lock when in reality the remote device is not physically near the lock. During a relay attack, communication packets (both sent from the lock to the phone and vice versa) may be captured in one location and near instantly replayed/received in another location. This entire attack may be successfully performed without the victim becoming aware of the intrusion. The relay attack is also known in the art as the replay attack, the man-in-the-middle attack, and the mafia fraud attack.

More particularly, one particular relay attack includes two connected relay devices which are coupled to one another via a (wired or) wireless connection. Two wireless relay devices of this nature could be used to successfully break into and start PKE vehicles. Applying this relay attack to a door in a structure, for example, a first relay device is physically positioned on the exterior side of the door in a location that is known to allow access had the lock been touched with an authorized remote device in such a location (i.e., sufficiently close to the lock to overcome the signal strength threshold). The second relay device must be physically positioned adjacent to the user's remote access device such that the second relay device successfully captures the remote access device's RF signals, the remote device's RF signals intended to be sent directly to the lock without interception.

A typical attack of the nature described above may include a first attacker holding the first relay device in the appropriate location next to the lock and touching the lock. The lock in response may "wake up" and attempt to connect to the user's remote access device. The first relay device captures the RF signals radiated from the lock intended for the user's remote access device and wirelessly RELAYS the signals to the second relay device. The second relay device wirelessly receives the signals and REPLAYS the signals. The user's remote access device (physically adjacent to the second relay device) receives the lock's RF signals from the second relay device. The user's remote access device unknowingly assumes the received signals were sent directly from the lock, and the lock and the remote access device perform an authentication/authorization all the while the user's remote access device is physically no where near the lock.

The wireless access control system 200 addresses such a relay attack by maintaining a connection, for example, a constant and/or Bluetooth connection between the lock assembly 230 and the remote access device 250. While setting up a typical connection between a lock assembly 230 and the remote access device 250, the two devices agree upon a channel hopping scheme that they adhere to during the connection. In a relay attack, such as, for example, as described above, a lock and a remote access device are generally unaware that there are actually two connections (a first connection between a lock and a first relay device and a second connection between the remote access device and a second relay device). The relay devices effectively trick both the lock assembly and the remote access device into thinking they are connected directly to one another as opposed to through the relay device channel.

Moreover, the magnetic field based upon the magnetic field characteristic may not be easily replicated over a communication channel. As will be appreciated by those skilled in the art, there are several natural phenomena that generally cannot be easily predicted or measured in time to replicate. One such phenomenon is the charge and discharge of a magnetic field generator, such as, for example, a coil. However, the charge and discharge curve of a magnetic coil is a phenomenon that can be predicted by fitting it to a curve within a certain error tolerance. Being able to replicate this curve in real time in such a way that the replication cannot be easily detected as counterfeit may be a relatively difficult problem, for example, during a relay attack. In such a case, the relayer would have to send instantaneous communications to the replayer, and in this case, the delay of milliseconds caused by information propagation, phenomenon detection, and coil charge in the "counterfeit coil," all make this type of attack relatively difficult. Circuitry of the lock assembly 230 and the remote access wireless device 250, for example, RL circuits and RLC circuits therein, have a reaction time that may be measured in nanoseconds, and the tolerance of these circuits can be made to be significantly better than the theoretical limitations of wave propagation provided by the speed of light.

Thus, as far as theoretical physics go, the wireless access control system 200 may create an "event" by way of a generated magnetic field that propagates such that the event cone of the event is faster than any theoretical speed by which packetized data can be sent, processed, forwarded, received, and acted upon in a relay scenario. As long as both the lock assembly 230 and the remote access wireless device 250 communicate or "agree" upon the magnetic field characteristic, for example, the shape of the curve ahead of time, and both the lock assembly and the remote access wireless device have a timing tolerance in the microsecond range, it should be nearly impossible for the curve to be replayed in such a way that would be within this tolerance window, as will be appreciated by those skilled in the art.

The wireless access control system 200 thus allows an authorized user to touch-to-open the lock 231 when the remote access device 250 is within a threshold proximity of the exterior side of the lock assembly 230. While it has been shown that proximity can be "spoofed" through a relay attack, the wireless access control system 200 may reduce this spoofing by way of the magnetic field generated based upon the magnetic field characteristic, which may not be easily replicated in a relay attack.

Figure 10:
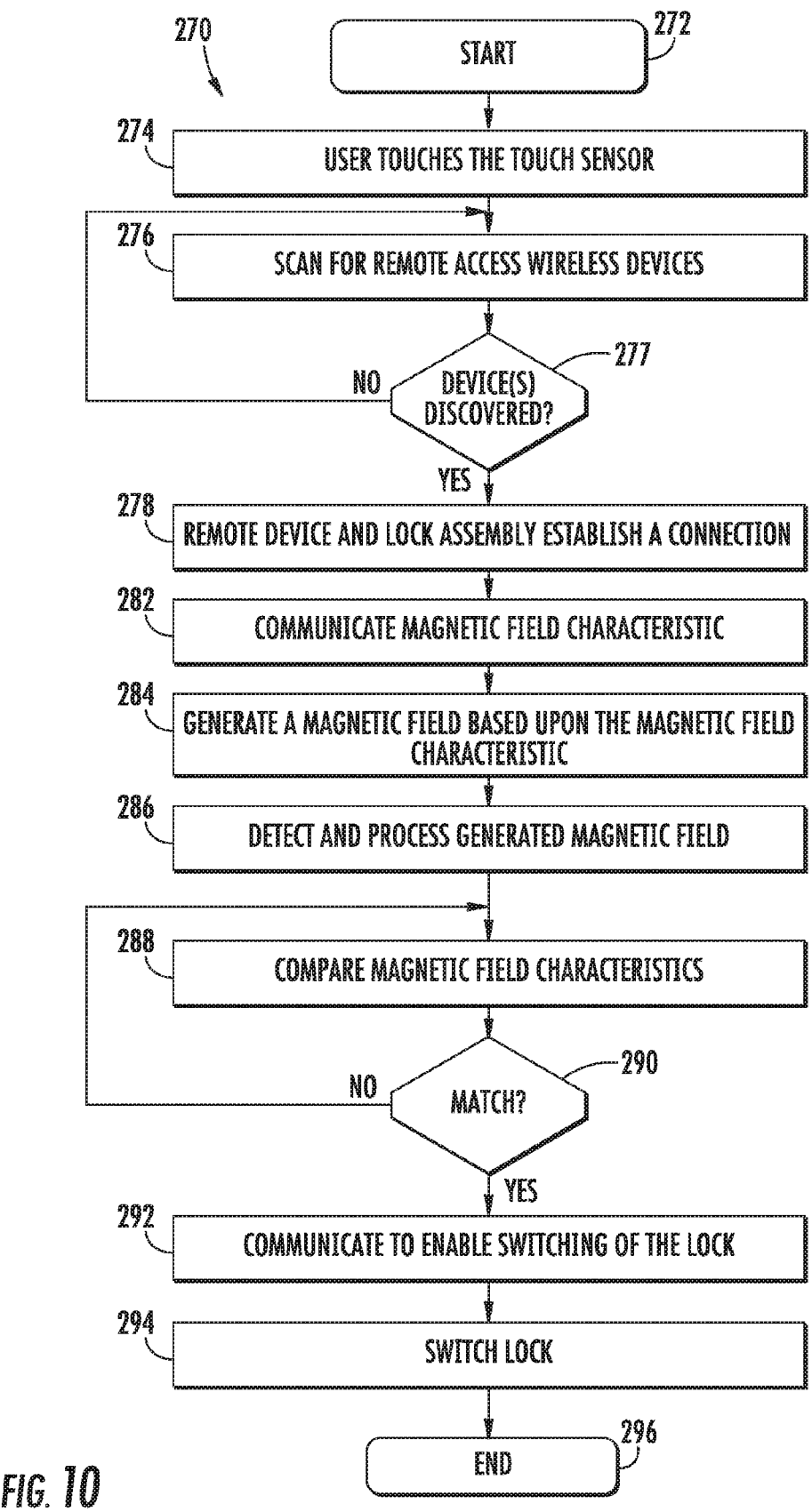
FIG. 10 is a flowchart of a method of wireless access control according to an embodiment.

Referring now to the flowchart 270 in FIG. 10, and beginning at Block 272, an exemplary method of wireless access using the above-described wireless access control system 200 is described. At Block 274, a user 222 approaches, from the outside of the door 221 and touches the touch sensor 235 on the lock assembly 230.

At Block 276, the lock assembly "wakes up" and the lock controller 234 cooperates with the lock wireless communications circuitry 232 to scan for remote access wireless devices 250 that are within communications range. If, at Block 277, the lock controller 234 discovers a remote access wireless device 250, the lock assembly 230 and the remote access wireless device 250 establish a communications connection, for example, a Bluetooth connection (Block 278). If no remote access wireless communications devices 250 are discovered at Block 277, the lock controller 234 continues to scan for remote access wireless communications devices 250 at Block 276. At Block 282, the lock controller 234, via the lock wireless communications circuitry 232, communicates the magnetic field characteristic, and more particularly, exchanges encrypted Bluetooth packets in accordance with the above-described challenge and response process and verifies both the lock assembly 230 and the remote access wireless device 250 have the same shared secret or magnetic field characteristic.

At Block 284, the lock controller 234 cooperates with the magnetic field generator 233 to generate a magnetic field based upon the magnetic field characteristic. More particularly, in one embodiment, the lock controller 234 may cooperate to charge an inductor at a precise moment in time, for a specific amount of time, and then discharges the inductor when the magnetic field charge reaches a particular amplitude, for example, a maximum amplitude, and for a selected amount of time. Thus, a distinct magnetic field is created.

At Block 286, the magnetic sensor 253 of the remote access wireless device 250 detects the received magnetic field, which is processed by the remote access wireless device controller 254. Since the lock assembly 230 and the remote access wireless device 250 collectively agreed upon when to detect the magnetic field and the particular characteristics of the magnetic field, the remote access wireless device controller 254 compares, at Block 288, the magnetic characteristic of a Fourier analyzed version of the magnetic field to the magnetic field characteristic. If, at Block 290, the remote access wireless device 250 determines that sensed magnetic field matches or has a characteristic that is within a threshold of the expected magnetic field characteristic, the remote access wireless device controller 254 communicates with the lock controller 234 to enable switching, e.g. unlocking, of the lock 231 (Block 292). If there is no match at Block 290, the remote access wireless device controller 254 compares the magnetic field characteristics at Block 288. This may continue for a threshold time period (not shown) at which point the method would end at Block 296.

At Block 294, after receiving verification that the remote access wireless device 250 communicated with the lock controller to enable switching of the lock 231, the lock controller 234 switches the lock, for example, to the unlocked position. Of course, switching of the lock 231 may occur based upon successful authentication. The method ends at Block 296.

Although the method steps are described above as discrete steps, for example, that may take a relatively large amount of time to complete, the process occurs relatively quickly, for example, on the order of tens to hundreds of milliseconds so that a total time from the user 222 touching the touch sensor 235 to the unlocking of the lock 231 may be less than one second. In other words, the method steps described above, in additional to other steps, for example, authentication, may occur simultaneously or serially.

Referring now to FIG. 11, in another embodiment, the magnetic field generator 233' is carried by the remote access wireless device 250' and the lock assembly 230' includes a magnetic sensor 253'. In the present embodiment the remote access wireless device controller 254' communicates, via the remote access wireless device wireless communications circuitry 252', the magnetic field characteristic with the lock wireless communications circuitry 232', and cooperates with the magnetic field generator 233' to generate a magnetic field based upon the magnetic field characteristic. The lock controller 234' cooperates with the magnetic sensor 253' to sense the magnetic field, compares the sensed magnetic field to the magnetic field characteristic, and enables unlocking of the lock 231' when the sensed magnetic field has a sensed magnetic field characteristic that matches the at least one magnetic field characteristic.

It should be noted that while particular embodiments have been described, the different embodiments may be used together in whole or in part. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. A wireless access control system comprising:
   a remote access wireless device to be carried by a user and comprising a remote housing, remote access wireless device wireless communications circuitry carried by said remote housing, a magnetic sensor carried by said remote housing, and a remote access wireless device controller coupled to said remote access wireless device wireless communications circuitry and said magnetic sensor;
   a lock assembly to be mounted on a door and comprising a lock, lock wireless communications circuitry, a magnetic field generator, a touch sensor, and a lock controller coupled to said lock, said lock wireless communications circuitry, said magnetic field generator, and said touch sensor;
   said lock controller configured to
      communicate, via said lock wireless communications circuitry, at least one magnetic field characteristic with said remote access wireless device wireless communications circuitry based upon said touch sensor, and cooperate with said magnetic field generator to generate a magnetic field based upon the at least one magnetic field characteristic;

said remote access wireless device controller configured to cooperate with said magnetic sensor to sense the magnetic field, compare the sensed magnetic field to the at least one magnetic field characteristic, and communicate, via said remote access wireless device wireless communications circuitry and said lock wireless communications circuitry to enable unlocking of said lock when the sensed magnetic field has a sensed magnetic field characteristic that matches the at least one magnetic field characteristic.

2. The wireless access control system of claim 1 wherein said lock controller is configured to communicate with said remote access wireless device communications circuitry for authentication of said remote access wireless device; and wherein said lock controller is configured to enable unlocking of said lock based upon the authentication.

3. The wireless access control system of claim 1 wherein said lock controller is configured to change the at least one magnetic field characteristic over time.

4. The wireless access control system of claim 1 wherein the at least one magnetic field characteristic comprises a range of time for sensing the magnetic field.

5. The wireless access control system of claim 1 wherein said lock controller is configured to encrypt the at least one magnetic field characteristic.

6. The wireless access control system of claim 1 wherein said magnetic sensor comprises a Hall effect sensor.

7. The wireless access control system of claim 1 wherein said magnetic sensor comprises a magnetometer.

8. The wireless access control system of claim 1 wherein the at least one magnetic field characteristic comprises a plurality of magnetic field characteristics.

9. A lock assembly to be mounted to a door for a wireless access control system comprising a remote access wireless device to be carried by a user and comprising a remote housing, remote access wireless device wireless communications circuitry carried by the remote housing, a magnetic sensor carried by the remote housing, and a remote access wireless device controller coupled to the remote access wireless device wireless communications circuitry and the magnetic sensor, the lock assembly comprising:

a lock;

lock wireless communications circuitry;

a magnetic field generator;

a touch sensor; and a lock controller coupled to said lock, said lock wireless communications circuitry, said magnetic field generator, and said touch sensor, said lock controller configured to communicate, via said lock wireless communications circuitry, at least one magnetic field characteristic with the remote access wireless device wireless communications circuitry based upon said touch sensor, and cooperate with said magnetic field generator to generate a magnetic field based upon the at least one magnetic field characteristic, the magnetic field, upon being sensed by the magnetic sensor, causing the remote access wireless device controller to compare the sensed magnetic field to the at least one magnetic field characteristic, and communicate, via the remote access wireless device wireless communications circuitry and said lock wireless communications circuitry to enable unlocking of said lock when the sensed magnetic field has a sensed magnetic field characteristic that matches the at least one magnetic field characteristic.

10. The lock assembly of claim 9 wherein said lock controller is configured to communicate with the remote access wireless device communications circuitry for authentication of said remote access wireless device; and wherein said lock controller is configured to enable unlocking of said lock based upon the authentication.

11. The lock assembly of claim 9 wherein said lock controller is configured to change the at least one magnetic field characteristic over time.

12. The lock assembly of claim 9 wherein the at least one magnetic field characteristic comprises a range of time for sensing the magnetic field.

13. A remote access wireless device to be carried by a user and for a wireless access system comprising a lock assembly to be mounted on a door and comprising a lock, lock wireless communications circuitry, a magnetic field generator, and a lock controller coupled to the lock, the lock wireless communications circuitry, and the magnetic field generator, the lock controller configured to communicate, via the lock wireless communications circuitry, at least one magnetic field characteristic with the remote access wireless device, the at least one magnetic field characteristic comprises at least one of a peak time, charge time, discharge time, charge resistance, and discharge resistance, and cooperate with the magnetic field generator to generate a magnetic field based upon the at least one magnetic field characteristic, the remote access wireless device comprising:

a remote housing;

remote access wireless device wireless communications circuitry carried by said remote housing;

a magnetic sensor carried by said remote housing; and a remote access wireless device controller coupled to said remote access wireless device wireless communications circuitry and said magnetic sensor, said remote access wireless device controller configured to cooperate with said magnetic sensor to sense the magnetic field, compare the sensed magnetic field to the at least one magnetic field characteristic, and communicate, via said remote access wireless device wireless communications circuitry and the lock wireless communications circuitry to enable unlocking of said lock when the sensed magnetic field has a sensed magnetic field characteristic that matches the at least one magnetic field characteristic.

14. The remote access wireless device of claim 13 wherein the at least one magnetic field characteristic comprises a range of time for sensing the magnetic field.

15. The remote access wireless device of claim 13 wherein said magnetic sensor comprises a Hall effect sensor.

16. The remote access wireless device of claim 13 wherein said magnetic sensor comprises a magnetometer.

17. A wireless access control method for a wireless access control system comprising a remote access wireless device to be carried by a user and comprising a remote housing, remote access wireless device wireless communications circuitry carried by the remote housing, a magnetic sensor carried by the remote housing, and a remote access wireless device controller coupled to the remote access wireless device wireless communications circuitry and the magnetic sensor, and a lock assembly to be mounted on a door and comprising a lock, lock wireless communications circuitry, a magnetic field generator, and a lock controller coupled to the lock, the lock wireless communications circuitry, and the magnetic field generator, the method comprising:

using the lock controller to
communicate, via the lock wireless communications circuitry, at least one magnetic field characteristic with the remote access wireless device wireless communications circuitry, the at least one magnetic field characteristic comprises at least one of a peak time, charge time, discharge time, charge resistance, and discharge resistance, and
cooperate with the magnetic field generator to generate a magnetic field based upon the at least one magnetic field characteristic; and
using the remote access wireless device controller to
cooperate with the magnetic sensor to sense the magnetic field,
compare the sensed magnetic field to the at least one magnetic field characteristic, and
communicate, via the remote access wireless device wireless communications circuitry and the lock wireless communications circuitry to enable unlocking of the lock when the sensed magnetic field has a sensed magnetic field characteristic that matches the at least one magnetic field characteristic.

18. The method of claim 17 wherein using the lock controller comprises using the lock controller to communicate with the remote access wireless device communications circuitry for authentication of the remote access wireless device and enable unlocking of the lock based upon the authentication.

19. The method of claim 17 wherein the lock controller changes the at least one magnetic field characteristic over time.

20. A wireless access control system comprising:
a remote access wireless device to be carried by a user and comprising a remote housing, remote access wireless device wireless communications circuitry carried by said remote housing, a magnetic sensor carried by said remote housing, and a remote access wireless device controller coupled to said remote access wireless device wireless communications circuitry and said magnetic sensor; and
a lock assembly to be mounted on a door and comprising a lock, lock wireless communications circuitry, a magnetic field generator, and a lock controller coupled to said lock, said lock wireless communications circuitry, and said magnetic field generator;
said lock controller configured to
communicate, via said lock wireless communications circuitry, at least one magnetic field characteristic with said remote access wireless device wireless communications circuitry, the at least one magnetic field characteristic comprises at least one of a peak time, charge time, discharge time, charge resistance, and discharge resistance, and
cooperate with said magnetic field generator to generate a magnetic field based upon the at least one magnetic field characteristic;
said remote access wireless device controller configured to
cooperate with said magnetic sensor to sense the magnetic field,
compare the sensed magnetic field to the at least one magnetic field characteristic, and
communicate, via said remote access wireless device wireless communications circuitry and said lock wireless communications circuitry to enable unlocking of said lock when the sensed magnetic field has a sensed magnetic field characteristic that matches the at least one magnetic field characteristic.

21. The wireless access control system of claim 20 wherein said lock controller is configured to communicate with said remote access wireless device communications circuitry for authentication of said remote access wireless device; and wherein said lock controller is configured to enable unlocking of said lock based upon the authentication.

22. The wireless access control system of claim 20 wherein said lock controller is configured to change the at least one magnetic field characteristic over time.

23. The wireless access control system of claim 20 wherein the at least one magnetic field characteristic comprises a range of time for sensing the magnetic field.

24. The wireless access control system of claim 20 wherein said lock controller is configured to encrypt the at least one magnetic field characteristic.

25. The wireless access control system of claim 20 wherein said magnetic sensor comprises a Hall effect sensor.

26. The wireless access control system of claim 20 wherein said magnetic sensor comprises a magnetometer.

27. A wireless access control system comprising:
a remote access wireless device to be carried by a user and comprising a remote housing, remote access wireless device wireless communications circuitry carried by said remote housing, a magnetic sensor carried by said remote housing, and a remote access wireless device controller coupled to said remote access wireless device wireless communications circuitry and said magnetic sensor; and
a lock assembly to be mounted on a door and comprising a lock, lock wireless communications circuitry, a magnetic field generator, and a lock controller coupled to said lock, said lock wireless communications circuitry, and said magnetic field generator;
said lock controller configured to
communicate, via said lock wireless communications circuitry, at least one magnetic field characteristic with said remote access wireless device wireless communications circuitry, and
cooperate with said magnetic field generator to generate at least one magnetic pulse based upon the at least one magnetic field characteristic;
said remote access wireless device controller configured to
cooperate with said magnetic sensor to sense the at least one magnetic pulse,
compare the sensed at least one magnetic pulse to the at least one magnetic field characteristic, and
communicate, via said remote access wireless device wireless communications circuitry and said lock wireless communications circuitry to enable unlocking of said lock when the sensed at least one magnetic pulse has a sensed magnetic field characteristic that matches the at least one magnetic field characteristic.

28. The wireless access control system of claim 27 wherein said lock controller is configured to communicate with said remote access wireless device communications circuitry for authentication of said remote access wireless device; and wherein said lock controller is configured to enable unlocking of said lock based upon the authentication.

29. The wireless access control system of claim 27 wherein said lock controller is configured to change the at least one magnetic field characteristic over time.

30. The wireless access control system of claim 27 wherein the at least one magnetic field characteristic comprises a range of time for sensing the magnetic field.

31. The wireless access control system of claim 27 wherein said lock controller is configured to encrypt the at least one magnetic field characteristic.

32. The wireless access control system of claim 27 wherein said magnetic sensor comprises a Hall effect sensor.

33. The wireless access control system of claim 27 wherein said magnetic sensor comprises a magnetometer.

34. A wireless access control system comprising:
a remote access wireless device to be carried by a user and comprising a remote housing, remote access wireless device wireless communications circuitry carried by said remote housing, a magnetic sensor carried by said remote housing, and a remote access wireless device controller coupled to said remote access wireless device wireless communications circuitry and said magnetic sensor; and
a lock assembly to be mounted on a door and comprising a lock, lock wireless communications circuitry, a magnetic field generator, and a lock controller coupled to said lock, said lock wireless communications circuitry, and said magnetic field generator;
said lock controller configured to
communicate, via said lock wireless communications circuitry, at least one magnetic field characteristic with said remote access wireless device wireless communications circuitry, and
cooperate with said magnetic field generator to generate a magnetic field based upon the at least one magnetic field characteristic;
said remote access wireless device controller configured to
cooperate with said magnetic sensor to sense the magnetic field,
compare the sensed magnetic field to the at least one magnetic field characteristic based upon a fast Fourier transform, and
communicate, via said remote access wireless device wireless communications circuitry and said lock wireless communications circuitry to enable unlocking of said lock when the sensed magnetic field has a sensed magnetic field characteristic that matches the at least one magnetic field characteristic.

35. The wireless access control system of claim 34 wherein said lock controller is configured to communicate with said remote access wireless device communications circuitry for authentication of said remote access wireless device; and wherein said lock controller is configured to enable unlocking of said lock based upon the authentication.

36. The wireless access control system of claim 34 wherein said lock controller is configured to change the at least one magnetic field characteristic over time.

37. The wireless access control system of claim 34 wherein the at least one magnetic field characteristic comprises a range of time for sensing the magnetic field.

38. The wireless access control system of claim 34 wherein said lock controller is configured to encrypt the at least one magnetic field characteristic.

39. The wireless access control system of claim 34 wherein said magnetic sensor comprises a Hall effect sensor.

40. The wireless access control system of claim 34 wherein said magnetic sensor comprises a magnetometer.

41. The wireless access control system of claim 34 wherein the at least one magnetic field characteristic comprises a plurality of magnetic field characteristics.

42. A lock assembly to be mounted to a door for a wireless access control system comprising a remote access wireless device to be carried by a user and comprising a remote housing, remote access wireless device wireless communications circuitry carried by the remote housing, a magnetic sensor carried by the remote housing, and a remote access wireless device controller coupled to the remote access wireless device wireless communications circuitry and the magnetic sensor, the lock assembly comprising:
a lock;
lock wireless communications circuitry;
a magnetic field generator; and
a lock controller coupled to said lock, said lock wireless communications circuitry, and said magnetic field generator, said lock controller configured to
communicate, via said lock wireless communications circuitry, at least one magnetic field characteristic with the remote access wireless device wireless communications circuitry, the at least one magnetic field characteristic comprises at least one of a peak time, charge time, discharge time, charge resistance, and discharge resistance, and
cooperate with said magnetic field generator to generate a magnetic field based upon the at least one magnetic field characteristic, the magnetic field, upon being sensed by the magnetic sensor, causing the remote access wireless device controller to compare the sensed magnetic field to the at least one magnetic field characteristic, and communicate, via the remote access wireless device wireless communications circuitry and said lock wireless communications circuitry to enable unlocking of said lock when the sensed magnetic field has a sensed magnetic field characteristic that matches the at least one magnetic field characteristic.

43. The lock assembly of claim 42 wherein said lock controller is configured to communicate with the remote access wireless device communications circuitry for authentication of said remote access wireless device; and wherein said lock controller is configured to enable unlocking of said lock based upon the authentication.

44. The lock assembly of claim 42 wherein said lock controller is configured to change the at least one magnetic field characteristic over time.

45. The lock assembly of claim 42 wherein the at least one magnetic field characteristic comprises a range of time for sensing the magnetic field.

46. A lock assembly to be mounted to a door for a wireless access control system comprising a remote access wireless device to be carried by a user and comprising a remote housing, remote access wireless device wireless communications circuitry carried by the remote housing, a magnetic sensor carried by the remote housing, and a remote access wireless device controller coupled to the remote access wireless device wireless communications circuitry and the magnetic sensor, the lock assembly comprising:
a lock;
lock wireless communications circuitry;
a magnetic field generator; and
a lock controller coupled to said lock, said lock wireless communications circuitry, and said magnetic field generator, said lock controller configured to
communicate, via said lock wireless communications circuitry, at least one magnetic field characteristic with the remote access wireless device wireless communications circuitry, and cooperate with said magnetic field generator to generate at least one magnetic pulse based upon the at least one magnetic field characteristic, the at least one magnetic pulse, upon being sensed by the magnetic sensor, causing the remote access wireless device controller to compare the sensed at least one magnetic pulse to the at least one magnetic field characteristic, and communicate, via the remote access wireless device wireless communications circuitry and said lock wireless communications circuitry to enable unlocking of said lock when the sensed at least one magnetic pulse has a sensed magnetic field characteristic that matches the at least one magnetic field characteristic.

47. The lock assembly of claim 46 wherein said lock controller is configured to communicate with the remote access wireless device communications circuitry for authentication of said remote access wireless device; and wherein said lock controller is configured to enable unlocking of said lock based upon the authentication.

48. The lock assembly of claim 46 wherein said lock controller is configured to change the at least one magnetic field characteristic over time.

49. The lock assembly of claim 46 wherein the at least one magnetic field characteristic comprises a range of time for sensing the magnetic field.

50. A remote access wireless device to be carried by a user and for a wireless access system comprising a lock assembly to be mounted on a door and comprising a lock, lock wireless communications circuitry, a magnetic field generator, and a lock controller coupled to the lock, the lock wireless communications circuitry, and the magnetic field generator, the lock controller configured to communicate, via the lock wireless communications circuitry, at least one magnetic field characteristic with the remote access wireless device, and cooperate with the magnetic field generator to generate a magnetic field based upon the at least one magnetic field characteristic, the remote access wireless device comprising:
a remote housing;
remote access wireless device wireless communications circuitry carried by said remote housing;
a magnetic sensor carried by said remote housing; and
a remote access wireless device controller coupled to said remote access wireless device wireless communications circuitry and said magnetic sensor, said remote access wireless device controller configured to
cooperate with said magnetic sensor to sense the magnetic field,
compare the sensed magnetic field to the at least one magnetic field characteristic based upon a fast Fourier transform, and
communicate, via said remote access wireless device wireless communications circuitry and the lock wireless communications circuitry to enable unlocking of said lock when the sensed magnetic field has a sensed magnetic field characteristic that matches the at least one magnetic field characteristic.

51. A remote access wireless device to be carried by a user and for a wireless access system comprising a lock assembly to be mounted on a door and comprising a lock, lock wireless communications circuitry, a magnetic field generator, and a lock controller coupled to the lock, the lock wireless communications circuitry, and the magnetic field generator, the lock controller configured to communicate, via the lock wireless communications circuitry, at least one magnetic field characteristic with the remote access wireless device, and cooperate with the magnetic field generator to generate at least one magnetic pulse based upon the at least one magnetic field characteristic, the remote access wireless device comprising:
a remote housing;
remote access wireless device wireless communications circuitry carried by said remote housing;
a magnetic sensor carried by said remote housing; and
a remote access wireless device controller coupled to said remote access wireless device wireless communications circuitry and said magnetic sensor, said remote access wireless device controller configured to
cooperate with said magnetic sensor to sense the at least one magnetic pulse,
compare the sensed at least one magnetic pulse to the at least one magnetic field characteristic, and
communicate, via said remote access wireless device wireless communications circuitry and the lock wireless communications circuitry to enable unlocking of said lock when the sensed at least one magnetic pulse has a sensed magnetic field characteristic that matches the at least one magnetic field characteristic.

52. The remote access wireless device of claim 51 wherein the at least one magnetic field characteristic comprises a range of time for sensing the magnetic field.

53. The remote access wireless device of claim 51 wherein said magnetic sensor comprises a Hall effect sensor.

54. The remote access wireless device of claim 51 wherein said magnetic sensor comprises a magnetometer.

55. A wireless access control method for a wireless access control system comprising a remote access wireless device to be carried by a user and comprising a remote housing, remote access wireless device wireless communications circuitry carried by the remote housing, a magnetic sensor carried by the remote housing, and a remote access wireless device controller coupled to the remote access wireless device wireless communications circuitry and the magnetic sensor, and a lock assembly to be mounted on a door and comprising a lock, lock wireless communications circuitry, a magnetic field generator, and a lock controller coupled to the lock, the lock wireless communications circuitry, and the magnetic field generator, the method comprising:
using the lock controller to
communicate, via the lock wireless communications circuitry, at least one magnetic field characteristic with the remote access wireless device wireless communications circuitry, and
cooperate with the magnetic field generator to generate at least one magnetic pulse based upon the at least one magnetic field characteristic; and
using the remote access wireless device controller to
cooperate with the magnetic sensor to sense the at least one magnetic pulse,
compare the sensed at least one magnetic pulse to the at least one magnetic field characteristic, and
communicate, via the remote access wireless device wireless communications circuitry and the lock wireless communications circuitry to enable unlocking of the lock when the sensed at least on magnetic pulse has a sensed magnetic field characteristic that matches the at least one magnetic field characteristic.

56. The method of claim 55 wherein using the lock controller comprises using the lock controller to communicate with the remote access wireless device communications circuitry for authentication of the remote access wireless device and enable unlocking of the lock based upon the authentication.

57. The method of claim 55 wherein the lock controller changes the at least one magnetic field characteristic over time.

58. A wireless access control method for a wireless access control system comprising a remote access wireless device to be carried by a user and comprising a remote housing, remote access wireless device wireless communications circuitry carried by the remote housing, a magnetic sensor carried by the remote housing, and a remote access wireless device controller coupled to the remote access wireless device wireless communications circuitry and the magnetic sensor, and a lock assembly to be mounted on a door and comprising a lock, lock wireless communications circuitry, a magnetic field generator, a touch sensor, and a lock controller coupled to the lock, the lock wireless communications circuitry, the magnetic field generator, and the touch sensor, the method comprising:

using the lock controller to communicate, via the lock wireless communications circuitry, at least one magnetic field characteristic with the remote access wireless device wireless communications circuitry based upon the touch sensor, and cooperate with the magnetic field generator to generate a magnetic field based upon the at least one magnetic field characteristic; and using the remote access wireless device controller to cooperate with the magnetic sensor to sense the magnetic field, compare the sensed magnetic field to the at least one magnetic field characteristic, and communicate, via the remote access wireless device wireless communications circuitry and the lock wireless communications circuitry to enable unlocking of the lock when the sensed magnetic field has a sensed magnetic field characteristic that matches the at least one magnetic field characteristic.

59. The method of claim 58 wherein using the lock controller comprises using the lock controller to communicate with the remote access wireless device communications circuitry for authentication of the remote access wireless device and enable unlocking of the lock based upon the authentication.

60. The method of claim 58 wherein the lock controller changes the at least one magnetic field characteristic over time.

\* \* \* \* \*